M. BLOCK.
DRUM TRAP COVER.
APPLICATION FILED NOV. 22, 1916.
1,239,453.
Patented Sept. 11, 1917.
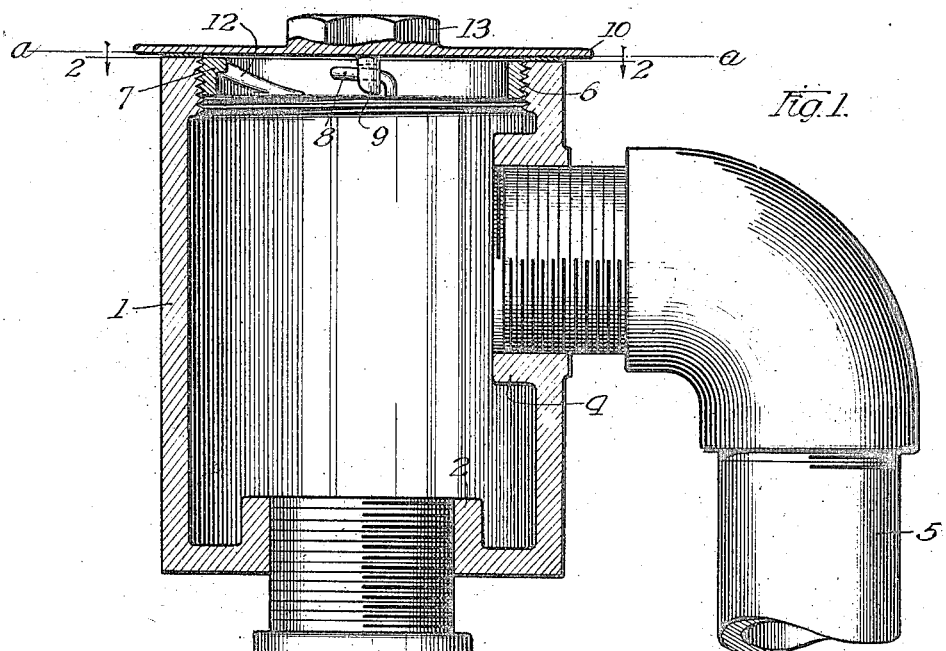
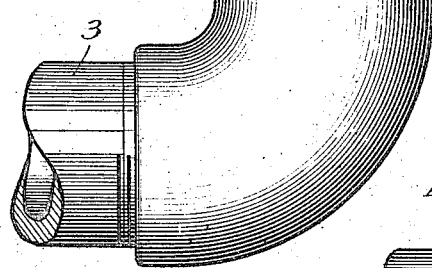
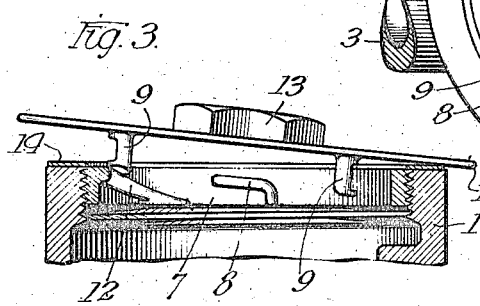
Witnesses:
Robert H. Weir
Arthur W. Carlson
Inventor
Mandel Block
By Cheever & Cox
Attys.

UNITED STATES PATENT OFFICE.

MANDEL BLOCK, OF CHICAGO, ILLINOIS.

DRUM-TRAP COVER.

1,239,453. Specification of Letters Patent. Patented Sept. 11, 1917.

Application filed November 22, 1916. Serial No. 132,763.

*To all whom it may concern:*

Be it known that I, MANDEL BLOCK, a citizen of the United States, residing at Chicago, in the county of Cook and State of Illinois, have invented a certain new and useful Improvement in Drum-Trap Covers, of which the following is a specification.

My invention relates to traps used in plumbing and is particularly concerned with the cover of traps commonly known as drum traps. In order to readily impart an understanding of the invention I will describe it as applied to a trap connected to the waste of a bath tub and will assume the ordinary installation in which the top of the drum is substantially flush with the floor line of the bath room. It will be readily understood by those familiar with the plumbing art that it is desirable that the trap cover lie as closely upon the floor as possible to thereby avoid unnecessary obstruction above the surface of the floor. It is also essential that the cover be screwed on tight, to avoid any danger of leakage under the pressure due to the difference in level between the surface of the water in the tub and the surface of the floor where the trap cover is located. Experienced plumbers will appreciate that as a result of these conditions, trap covers are frequently very difficult to remove. They are operated only at infrequent intervals with the result that threads of the cover are apt to become set by rust, sediment or otherwise, the cover is apt to stick upon the gasket, and finally the cover, projecting as it does over on to the surface of the floor, is apt to stick upon the floor, due to the presence between them of accumulation of dust to which moisture is frequently added when the bathroom floor is being mopped. The nuts by which standard drum trap covers are operated, are made thin so as not to project too high above the floor and hence do not offer a very good purchase and furthermore, the diameter of the nut is much smaller than the diameter of the cover, and hence the preponderance of leverage is against the plumber when he comes to unscrew the cover. Furthermore, these traps are frequently located in places where the plumber will find it difficult, if not impossible, to swing a long handled wrench and consequently, the unscrewing of the cover and rotating it through several full turns to take it off involves a great deal of labor, and frequently results in so damaging the nut that the cover cannot be removed without breaking it.

The object of my invention is to produce a drum trap and cover which will avoid these difficulties and enable the plumber or janitor to readily remove the cover without damage to it and without the exertion of great effort expended under unfavorable circumstances.

I accomplish my objects by the mechanism illustrated in accompanying drawings, in which:

Figure 1 is a side elevation, partly in axial section showing my drum trap and cover assembled connected up to the pipes with which the trap is designed to coöperate.

Fig. 2 is a plan view on the line 2—2, Fig. 1.

Fig. 3 is a fragmentary view taken in axial section at the top of the cover and illustrating the quick-acting principle of the device.

Similar numerals refer to similar parts throughout the several views.

In the form selected to illustrate the invention, the drum trap 1 has a threaded boss 2 at the bottom into which the drain pipe 3 from the bath tub leads. It also has a threaded boss 4 from which the down pipe 5 leads to the sewer. An internal thread 6 is formed at the upper end of the drum. Screwing into this trap is a ring 7 which I prefer to construct of brass or other non-corrosive metal, although this is a matter of practice which does not vitally concern the invention. This ring according to the present design has three lugs 8 extending inward from the sides of the ring and having their insides arranged approximately on a spiral for engaging the fingers 9 projecting downward from the inside of the trap cover 10. These lugs preferably extend circumferentially but a few degrees; for example, it is ordinarily sufficient if they extend but thirty degrees or so—sufficiently to insure a tight clamping action when the cover is rotated. Between two of these lugs 8 on the ring 7 is formed a cam 12, the lower point of which is lower than the bottom of the lugs 8, so as to engage the lower end of the fingers 9 when the cover 10 is being rotated in a direction to leave the lugs. By preference, there is only one of these cams 12 for reasons which will hereinafter become apparent.

The cover 10 is provided with a nut 13 and a gasket 14 of rubber or other suitable substance is provided at the top of the trap to help make an air tight and water tight connection between the trap and the cover.

In operation, after the drum and its pipes are installed as in Fig. 1, the device is made ready for operation by screwing ring 7 into position and then lowering the cover and giving it a slight turn to cause the fingers 9 to engage the lugs 8. If the installation is new and it is so desired, the ring and the cover may be preassembled and then applied as a unit to the drum by rotating the cover and thus screwing the ring into the top of the drum. The gasket 14 will ordinarily be placed upon the top of the drum, as shown, and ordinarily the drum will be installed so that its upper end becomes substantially flush with the floor, indicated by the line $a$—$a$, Fig. 1. If now it is desired to remove the cover, the plumber applies a wrench to nut 13 and turns the cover a slight distance in a direction to unscrew it. The plumber does not have to rotate the cover but a little way before it is loose and one of the fingers 9 will reach up over the cam 12 and cause the cover to tilt in the manner shown in Fig. 3. By having but a single cam 12, only a single finger will be engaged, and hence only one side of the cover will make a rapid rise called for by the steep pitch of the cam. The cam has a pitch much steeper than any ordinary trap and hence one side of the cover will almost immediately rise off the gasket and off the floor, thereby loosening the cover at all points. While I do not make it as a positive statement, it is my understanding that my device in thus quickly releasing, operates upon the principal somewhat akin to the one involved in opening a so-called "Mason jar;" that is, a fruit jar having a screw cap screwing down on to a rubber gasket. It is well known that these jars are usually very tightly sealed and yet the cover may be readily removed by drawing out a very small section of the rubber gasket. A loosening at one point seems to result in a ready loosening at all points, and in my device this loosening is accomplished by the cam quickly tilting up one side of the cover as shown in Fig. 3.

I prefer to make the ring 7 a separate piece, for by so doing I am able to adapt my cover to a standard drum trap and thus use it in connection with devices already upon the market. It will be understood, however, that so far as the principle of the invention is concerned, the ring may be integral with the drum.

It will be noted that the ring 6 does not obstruct the opening at the top of the drum. Practically the whole space is left for the plumber to reach into the drum for cleaning and other purposes.

Having thus described my invention, what I claim as new and desire to secure by Letters Patent, is:—

1. In a device of the class described, the combination of a drum and a cover having interlocking members adapted to tightly engage when the cover is rotated slightly in one direction, and means on the drum for tilting up one side of the cover when said cover is rotated in a direction to disengage the interlocking means.

2. A drum trap having a plurality of internal, inclined lugs, a cover having fingers for engaging said lugs, said lugs extending angularly less than 120 degrees whereby the cover is quickly released when rotated in a negative direction, and an internal cam on said drum for engaging one of said fingers to uplift one side only of the cover when the nearest finger releases its lug.

3. A drum trap having an internal thread at the top, a ring screwing into said thread and having a plurality of internal, inclined lugs extending angularly less than 120 degrees, and a cam on said ring for engaging one of said fingers to tilt the cover when rotated slightly in a negative direction.

4. A drum trap having an internal thread at the top, a ring screwing into said thread and having at least three separate internal inclined lugs for quickly releasing the cover when rotated in a negative direction, and a single cam formed on the inside of said ring and extending angularly less than 120 degrees for uplifting one side of the cover when the latter is rotated in a negative direction, said fingers being located in position for the nearest one to over-ride the cam when the cover is rotated negatively.

In witness whereof, I have hereunto subscribed my name.

MANDEL BLOCK.